(12) United States Patent
Abileah et al.

(10) Patent No.: US 9,268,008 B1
(45) Date of Patent: Feb. 23, 2016

(54) DETECTION OF LOW OBSERVABLE OBJECTS IN CLUTTER USING NON-COHERENT RADARS

(75) Inventors: Ron Abileah, San Carlos, CA (US);
Phillip A. Fox, Hertford, NC (US);
Joseph W. Maresca, Jr., Sunnyvale, CA (US)

(73) Assignee: Vista Research, Inc., Sunnyvale, CA (US)

( * ) Notice: Subject to any disclaimer, the term of this patent is extended or adjusted under 35 U.S.C. 154(b) by 595 days.

(21) Appl. No.: 13/317,099

(22) Filed: Oct. 7, 2011

Related U.S. Application Data

(60) Provisional application No. 61/404,748, filed on Oct. 7, 2010.

(51) Int. Cl.
| | |
|---|---|
| G01S 13/52 | (2006.01) |
| G01S 7/02 | (2006.01) |
| G01S 7/292 | (2006.01) |
| G01S 13/72 | (2006.01) |
| G01S 13/86 | (2006.01) |

(52) U.S. Cl.
CPC ............... *G01S 7/022* (2013.01); *G01S 7/021* (2013.01); *G01S 7/292* (2013.01); *G01S 13/726* (2013.01); *G01S 13/86* (2013.01)

(58) Field of Classification Search
CPC ....... G01S 13/726; G01S 13/86; G01S 7/292; G01S 13/534; G01S 13/538
USPC .................................................. 342/159–163
See application file for complete search history.

(56) References Cited

U.S. PATENT DOCUMENTS

| | | | | | |
|---|---|---|---|---|---|
| 3,797,014 | A | * | 3/1974 | Tompkins et al. | 342/90 |
| 4,035,800 | A | * | 7/1977 | Lewis et al. | 342/160 |
| 4,542,382 | A | * | 9/1985 | Hol | 342/91 |
| 4,768,035 | A | * | 8/1988 | Thurber et al. | 342/194 |
| 5,539,412 | A | * | 7/1996 | Mendelson | 342/192 |
| 5,563,604 | A | * | 10/1996 | Brandao et al. | 342/159 |
| 5,629,929 | A | * | 5/1997 | Blanchard et al. | 370/201 |
| 5,959,566 | A | * | 9/1999 | Petty | 342/25 B |
| 6,809,681 | B1 | * | 10/2004 | Niechayev | 342/159 |
| 7,940,206 | B2 | * | 5/2011 | Nohara et al. | 342/59 |
| 2006/0220946 | A1 | * | 10/2006 | Nohmi | 342/107 |
| 2006/0238406 | A1 | * | 10/2006 | Nohara et al. | 342/90 |
| 2008/0252527 | A1 | * | 10/2008 | Garcia | 342/450 |
| 2009/0015460 | A1 | * | 1/2009 | Fox et al. | 342/53 |
| 2011/0001657 | A1 | * | 1/2011 | Fox et al. | 342/107 |

OTHER PUBLICATIONS

Lan Du; Hongwei Liu; Zheng Bao, "Using the Amplitude Fluctuation Property of Target HRRP for Radar Automatic Target Recognition," Radar, 2006. CIE '06. International Conference on , vol., No., pp. 1,5, Oct. 16-19, 2006.*

* cited by examiner

*Primary Examiner* — John B Sotomayor
*Assistant Examiner* — Marcus Windrich
(74) *Attorney, Agent, or Firm* — Schwegman Lundberg & Woessner, P.A.

(57) ABSTRACT

A method and an apparatus for detection and tracking of one or more objects in land clutter, including strong clutter and low observable (LO) objects such as a humans, animals, vehicles, and small, low-flying aircraft using a non-coherent radar or the amplitude output of a coherent radar. The preferred embodiment of the method and apparatus uses an X-band, maritime, non-coherent radar and the Doppler spectra computed from the high-frequency amplitude modulations produced by the object interacting with the land-based clutter to determine the presence, velocity, and track of the object.

26 Claims, 13 Drawing Sheets

DETECTION OF LOW OBSERVABLE OBJECTS IN CLUTTER USING NON-COHERENT RADARS

The application claims the benefit of U.S. Provisional Application Ser. No. 61/404,748 filed Oct. 7, 2010.

BACKGROUND OF THE INVENTION

1.0 Field of the Invention

A method and an apparatus is described for detection and tracking of one or more objects over land in the presence of land-based clutter, including low observable (LO) objects such as a humans, animals, vehicles, or small low-flying aircraft using an non-coherent radar or the amplitude output from a coherent radar.

2.0 Brief Description of Prior Art

Wide area surveillance and persistent surveillance of an area or a facility, or the borders of a country, like the Southern Border of the United States of America, typically requires 360-degree radar coverage to detect and track people, animals with people on or alongside, vehicles, and small, low-flying aircraft/ultra-lights approaching or crossing the border with an operationally acceptable probability of detection ($P_D$) and probability of false alarm ($P_{FA}$). Detection and tracking of low observable (LO) objects or targets with a radar is usually accomplished with a coherent radar using range-Doppler or moving target indication (MTI) processing methods. In U.S. Pat. No. 8,026,844, Fox, et. al., teaches how a non-coherent radar can be used for surveillance applications. The method of the present invention illustrates a method and an apparatus for surveillance for use in moderate to high clutter conditions with a non-coherent radar that has similar performance to a coherent Doppler radar, and in additional, has several additional advantages in terms of reduced cost, extended range, operation on a wide range of platforms with motion that makes coherent Doppler radars unusable, more robust tracking, and detection of stationary targets.

If detection and tracking of small, slow moving land targets, such as people and vehicles, is done with a non-coherent radar, a high level of performance can be achieved in terms of $P_D$ and $P_{FA}$ when the radar operates under system noise or low clutter conditions. Unfortunately, such conditions do not typically exist very much of the time. The performance of non-coherent radar degrades seriously if the radar operates in moderate to high clutter conditions. In fact, detection is often not possible and the $P_{FA}$ can become unacceptably high. Part of the reason for this poor performance is that target is masked by land clutter and by wind clutter. The method and apparatus of the present invention allows operation in these higher clutter conditions for non-coherent radar. The method used to enhance the performance for slow-moving targets in wind clutter also work to improve the performance of coherent Doppler radars.

The method and apparatus of the present invention apply to the low-cost, non-coherent radars operating at X-band and other frequencies of similar wavelength (e.g., K-, Ku, C-, S-, and L-band). Such radars have been used for marine navigation applications for many years, but they were not used for detection and tracking of targets over land such people, animals, vehicles, and small low-flying aircraft until the method and apparatus showed that this was possible (U.S. Pat. No. 8,026,844). The amplitude/intensity data obtained from a non-coherent radar have been processed to detect targets of interest in the presence of low clutter or no clutter (i.e., system noise). In strong clutter, typically found when there are a lot of scatters in the radar coverage cells and coverage area (such as uneven and irregular terrain, trees, bushes, buildings, rocks, boulders and outcroppings), the clutter is large enough to prevent the detection of the smaller targets like people. Coherent Doppler radars, which are significantly more expensive than the non-coherent radars described herein, could exploit the movement of these weaker targets and detect them provided they had sufficient radar sensitivity (i.e., low system noise), sufficient Doppler resolution to sense the movement velocity, and robust signal processing algorithms to operate against slow-moving targets.

The method and apparatus of the present invention allows the non-coherent radar to operate under strong clutter conditions. As described above, when the radar dwell times are long enough to produce and allow the target modulations to be measured and processed appropriately, non-coherent radars can be used to detect (or track) small targets like people or ultra-lights, as well as larger targets, such as vehicles or small low-flying aircraft. The preferred method of processing is to produce a Doppler spectrum and then identify targets by their Doppler (velocity) and/or their spectral strength. However, such target modulation can also be detected by band-passing the data into velocity bins typical of the target motion and compare the intensity (e.g., the mean or median) or intensity fluctuations (e.g., variance or standard deviation) in the bin to that of the background and/or system noise.

The method of the present invention is based on the back-scattering of radar pulses broadcast by non-coherent radars, where interference effects between radar pulses scattered by the objects of interest (targets) and the surrounding clutter environment lead to the production of exploitable exoclutter signal energy. This signal energy manifests itself as high frequency amplitude modulations that are distinctive and identifying of the target type, characteristic of the target motion as well as the motion of other targets in close proximity, and exceed the amplitude of the radar response of the background clutter environment within a distinguishing frequency band. The targets are mainly ground targets, but the same method also works for low-flying aircraft and ultra-lights.

We call this phenomenon "wavefront interference Doppler (WiDop)." Wavefront interference has been applied to optics and light for determining range and velocity, but, as stated below, this phenomenon has not been identified or exploited for radar applications for detecting and tracking ground targets, especially slow-moving or small targets such as people. This phenomenon has significant applications for detecting and tracking people, vehicles, and low-flying aircraft of all types with low-cost, non-coherent radars, because it allows the non-coherent radar data to be processed into a Doppler spectrum, like the Doppler spectrum obtained with a coherent Doppler radar. The Doppler spectrum obtained with the WiDop processing gives the strength and the velocity of the target relative to the clutter or system noise, but has an ambiguity in the target direction. This ambiguity is easily resolved from the target track; it could be also be resolved with a more complex time-frequency-range algorithm.

As illustrated in Table 1, there are four general types of radars and radar processors to detect moving targets. They are (1) Moving Target Indication (MTI) processors for coherent Doppler radars (coherent MTI), (2) Doppler spectral processing for coherent Doppler radars (coherent Doppler), (3) MTI processors for noncoherent radars (non-coherent MTI), and (4) Doppler processing for noncoherent radars (non-coherent radar). Coherent radars use a phase reference produced by a stable oscillator to acquire phase and amplitude data. The coherent MTI processor identifies all moving targets by filtering out all non-Doppler shifted signals. A coherent Doppler processor produces a Doppler spectrum, which allows not only the target to be detected by the strength of the spectrum at each Doppler bin but is also capable of determining the magnitude and sign of the radial speed of the target in a similar way as done by coherent MTI and coherent Doppler radars. Unlike a coherent Doppler radar, the phase of the transmitted signal is unknown for a non-coherent radar, but in the presence of land clutter, the beating between the target and the land clutter provides a Doppler shifted target signal relative to the clutter. Thus, non-coherent MTI and non-coherent Doppler processors can be used. However, only the amplitude information is obtained; no phase information is obtained. Non-coherent Doppler is nearly identical to coherent Doppler processor except the sign of the radial speed is unknown. Non-coherent MTI processors have been used on airborne radars because the relative motion between the airborne radar and the target signal and the clutter was the same and removed as part of the MTI processing. Coherent radar, both coherent MTI and coherent Doppler systems have been and continue to be widely used. In contrast, non-coherent Doppler processor system have not been widely used, and more importantly, have not been used or demonstrated for land targets other than as described in U.S. Pat. No. 8,330,647.

TABLE 1

Four general types of radar and radar processors detecting and tracking targets

| Processor | Coherent Radar | Non-coherent Radar |
|---|---|---|
| Doppler | Coherent Doppler (1) | Non-coherent Doppler (2) |
| Moving Target Indication (MTI) | Coherent MTI (3) | Non-coherent MTI (4) |

In general, the best radar in terms of performance, everything else being equal, is a coherent radar, and the best processor considered to be a coherent Doppler processor. Thus, the best performance is (1) and the worse performance is (4). The method and apparatus of the present invention called WiDop (wave-front interference) is similar to the coherent Doppler radar and processor system, but has a number of advantages over a coherent radar in terms of cost, range, operation with platform motion, tracking, and detection of stationary targets.

Non-Coherent MTI.

Non-coherent MTI is coherent MTI without phase. It was invented very early in the history of radars. During WWII "the MIT Radiation Laboratory, set up "Project Firefly" to develop a non-coherent Airborne MTI radar (AMTI) for battlefield use. The resulting radar, the AN/APS-27," had a number of deficiencies [5]. Additional examples of non-coherent MTI implementations are the AN/TPN-19 and AN/UPS-1 radars [6-7]. Skolnick [2] explains non-coherent MTI as "externally coherent." Schleher [3] referred to "clutter referenced MTI." Skolnick [4] describes it as the "target vector beating with the clutter vector." All of the early applications were for separating aircraft from weather and ground clutter. Skolnik specifically states "the present discussion will be confined to airborne radar" since the concept does not hold well for ground targets and ground clutter discretes. In fact discrete clutter are recognized as especially difficult for non-coherent MTI.

Kretschmer et. al. [8] provide a detailed analysis of coherent vs. non-coherent MTI. Their FIGS. 1 and 3 lead to the following observations. (Note: panels a-b in FIG. 1 are switched.) The MTI performance depends on the length of the MTI canceller, the spectral width of the clutter, and whether or not the radar is coherent or non-coherent. Both coherent and non-coherent can provide very impressive gains against clutter, but coherent will generally do better. For example, with a 5-point MTI canceller the non-coherent MTI may provide a respectable 10 to 20 dB gain. Under the same conditions, coherent MTI provides an additional 5 to 10 dB gain or more. Non-coherent MTI processors are no longer used, mainly because of their poor performance relative to coherent MTI.

Non-Coherent Doppler.

Holm and Echard [9] provided a theoretical analysis of the two basic radar and two basic processor types in Table 1, including a non-coherent Doppler processor similar to WiDop. Theoretical SNR gains were provided with the conclusion that non-coherent Doppler is 10 dB better than non-coherent MTI and 3 dB less than coherent Doppler. The 3 dB difference is valid only when clutter and target are narrowband and are well separated such that the WiDop spectrum of the signal is entirely riding on receiver noise. The more general case with the target overlaps the clutter spectrum requires a more detailed analysis than performed by Holms-Echard.

Table 2 illustrates the relative difference in performance for all four radar/processor combinations based on the HolmEchard's theoretical estimate of SNR. It was assumed that non-coherent Doppler (WiDop) is arbitrarily set at an SNR of 30 dB as a reference point. It is further assumed that the SNRs are for a specific set of conditions and parameters and for simple, well separated target and clutter spectra. For real world conditions the SNR will be different and the Doppler vs MTI differences will be even more dramatic.

TABLE 2

SNR for 4 general types of radars and radar processors detecting and tracking targets

| Processor | Coherent Radar | Non-coherent Radar |
|---|---|---|
| Doppler | Coherent Doppler (1) 33 db | Non-coherent Doppler (2) 30 dB |
| Moving Target Indication (MTI) | Coherent MTI (3) 25 dB | Non-coherent MTI (4) 20 dB |

The paper by Holm-Echard is a theoretical mathematical analysis of two general types of radars and two general types of radar processing that were performed with idealized conditions and simplified assumptions. The paper did not indicate that any of the methods were actually demonstrated or implemented operationally, nor would they work for any of a large number of different radar platforms (airborne, space, ship, vehicle, or land platforms) and/or a large number of different types of targets (space, airborne, land, or ocean targets). In fact, at the time of the paper (1982), non-coherent Doppler processing was not being used and had not been applied to land targets. This is still true today except for the method and apparatus of the present invention. In fact, coherent Doppler processors were the main radar system being used for target detection problems, including and especially land targets.

The present invention provides a method and apparatus to detect and track low observable land objects such as a humans, vehicles, and small low-flying aircraft in the presence of land clutter, particularly those objects moving at low velocities relative to the radar look angle, using an non-coherent radar or the amplitude output of a coherent radar. WiDop exploits the beating phenomenon that occurs between a moving object and the land clutter. As stated above, this phenomenology was identified for non-coherent radars over 50 years ago for airborne radars, but it has never been applied to low observable land targets. In fact, the approach was confined for use on only airborne radars, because Skolnik concluded that the concept does not hold well for ground targets and ground clutter discretes. The approach was called non-coherent radar MTI, which found application on airborne radar systems for detecting and tracking aircraft, because it has the advantage that the airplane speed is automatically removed because the clutter and the target have the same phase reference. The method and apparatus of the present invention does not use MTI methods. It utilizes range-Doppler processing methods.

There are many reasons why this phenomenology has not been exploited using non-coherent radars for land targets, particularly small and slow moving targets like people. With the advent of coherent Doppler radars near the end of World War II and the high performance achieved with these radars for land targets, which is much higher than for non-coherent radars, there has been no motivation to develop a WiDop system for land targets.

An important motivation for the present invention is cost, because of the need for a large number of such radars for persistent and border surveillance applications for defense, intelligence, and homeland security applications. However, there are other important advantages besides cost that make the use of non-coherent radars very attractive. First, using WiDop, a non-coherent radar can be made to perform nearly as well as a coherent radar, but a non-coherent radar can operate at longer ranges because of its higher operating power, track better because of its high sample rate, detect stationary targets, which is not possible with a coherent Doppler radar, and operate on platforms without the adverse affects of platform motion. This latter advantage is particularly important, because the non-coherent radar using WiDop is immune to mechanical motion and phase instabilities that have made many of the coherent Doppler radars completely unusable on tower and aerostats because they have not implemented motion compensation. It is also important to note, that without the use of WiDop described herein, non-coherent radars will not perform well. This patent demonstrates with field data that the phenomenology will work for the proposed land objects and suggests some methods to significantly enhance WiDop. The method of WiDop is critical to the performance of non-coherent radars for detection and tracking of targets in clutter.

SUMMARY OF THE INVENTION

It is the object of this invention to provide a method and an apparatus for detecting or tracking targets of interest on land, especially small targets, such as people, vehicles, or low-flying aircraft by exploiting the modulation produced by a target in clutter with a non-coherent radar.

It is the object of this invention to provide a method and an apparatus for detecting or tracking slowly moving (relative to the radar look angle) targets of interest on land, especially small targets, such as people, vehicles, or low-flying aircraft by exploiting the modulation produced by a target in clutter with a non-coherent radar.

It is another object of this invention to provide a method and an apparatus for detecting or tracking targets of interest such as people, vehicles, or low-flying with a non-coherent radar when the clutter return is stronger than the targets.

It is still another object of this invention to provide a method and an apparatus for producing a Doppler spectrum using a non-coherent radar or only the amplitude/intensity data from a coherent radar.

It is yet another object of this invention to provide a method and an apparatus for measuring the Doppler or speed of a target using a non-coherent radar or only the amplitude/intensity data from a coherent radar without determining the position movement of the target over time from two or more radar dwells.

It is an object of this invention to provide a method and an apparatus for detecting or tracking targets of interest such as people, vehicles, or low-flying aircraft by exploiting the modulation produced by a target in clutter with a non-coherent X-band radar.

It is another object of this invention to provide a method and an apparatus for detecting or tracking targets of interest such as people, vehicles, or low-flying aircraft by exploiting the modulation produced by a target in clutter with low-cost maritime radars.

It is yet another object of this invention to provide a method and an apparatus for detecting or tracking targets of interest such as people, vehicles, or low-flying aircraft by exploiting the modulation produced by a target in clutter with non-coherent S-, C-, K-, X-, or L-band radars.

The method of the present invention is based on the backscattering of radar pulses broadcast by non-coherent radars, where interference effects between radar pulses scattered by the objects of interest (targets) and the surrounding clutter environment lead to the production of exploitable exoclutter signal energy. This signal energy manifests itself as high frequency amplitude modulations that are distinctive and identifying of the target type, characteristic of the target motion as well as the motion of other targets in close proximity, and exceed the amplitude of the radar response of the background clutter environment within a distinguishing frequency band.

The preferred embodiment of the method and apparatus of the present invention is intended for use in areas when the target in located in a region of clutter and is comprised of an non-coherent X-band maritime radar such as a Furuno radar, operating over a wide range of powers (e.g., 4 kW, 25 kW, or 50 kW), a data acquisition system to collect the amplitude time series for spectral analysis, a computer system to process the radar data to obtain an average Doppler spectrum for each radar cell from the high-frequency amplitude modulations produced by the target interacting with the clutter that contains spectral contributions from small land targets such as people or vehicles or small low-flying aircraft or ultra-lights, and signal processing algorithms to detect and track targets using the information provided by the Doppler spectrum. The strength, width, and Doppler (i.e. speed) of these target peaks, or combinations of all three can be used to detect the presence of the target or targets provided these spectral contributions are above the spectral noise floor. The preferred embodiment requires sufficient dwell time at each location (i.e., radar cell) to observe the modulated target signal and can benefit from the use of a small antenna to increase the beamwidth and the use of a slower antenna rotation rate than normally used of the radar to be decreased for slow moving targets. If the radar is operating against system noise or very weak clutter, then other established sampling and processing techniques can be applied. Many different radars can be used for this apparatus, including non-coherent and coherent radars provided that they are operated to observe the target-clutter modulation. In general, radars operating at K-band, as well as L-, C-, and S-band frequencies, are also good choices for this surveillance application.

IN THE DRAWINGS

Figure 6:
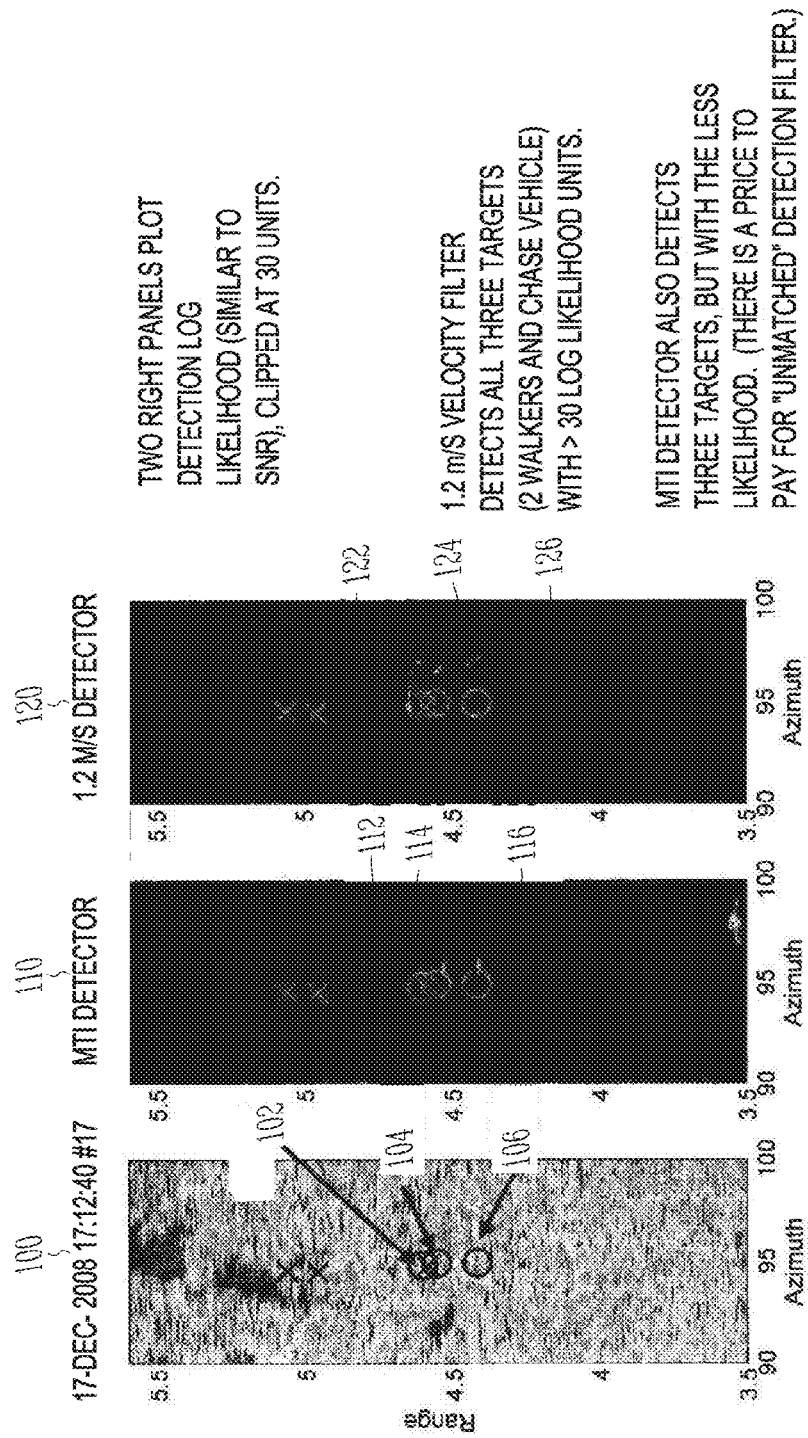

FIG. 6 illustrates an intensity plot ((on the right) of a 3 targets (two walkers and a SUV automobile following the walkers) on a road in strong clutter at 5 km processed using WiDop. The WiDop processed data is compared to the MTI processed data and to the raw data. The WiDop detections are significantly stronger than the detections made with an MTI processor. The targets are not visible in the raw data.

Figure 7:
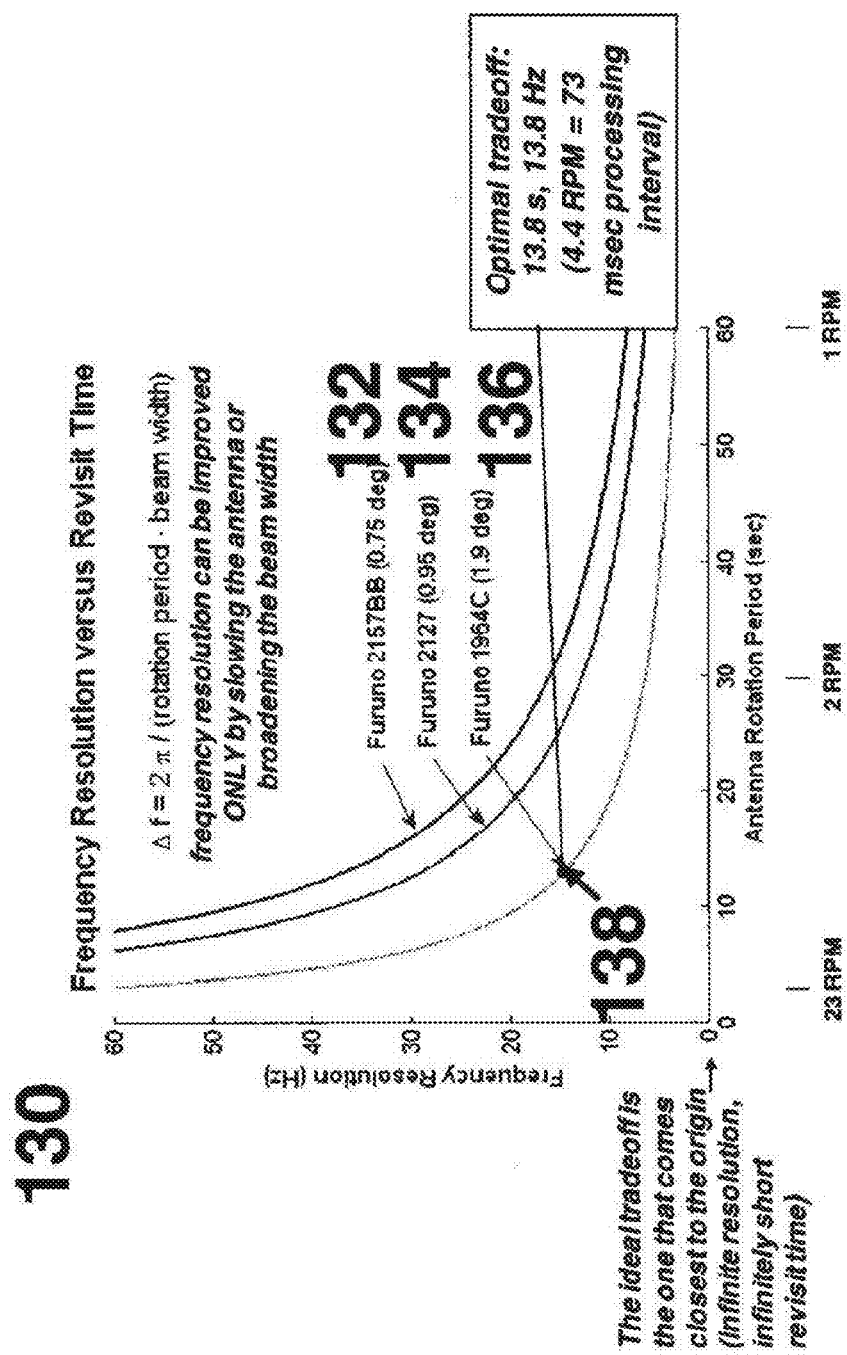

FIG. 7 illustrates a plot of the frequency resolution or the revisit time. The knee in the curve represents the optimal position to operate, but operations can occur above and below the knee.

Figure 8:

FIG. 8 illustrates vegetation that will produce Doppler spectrum broadening due to the wind.

Figure 9:
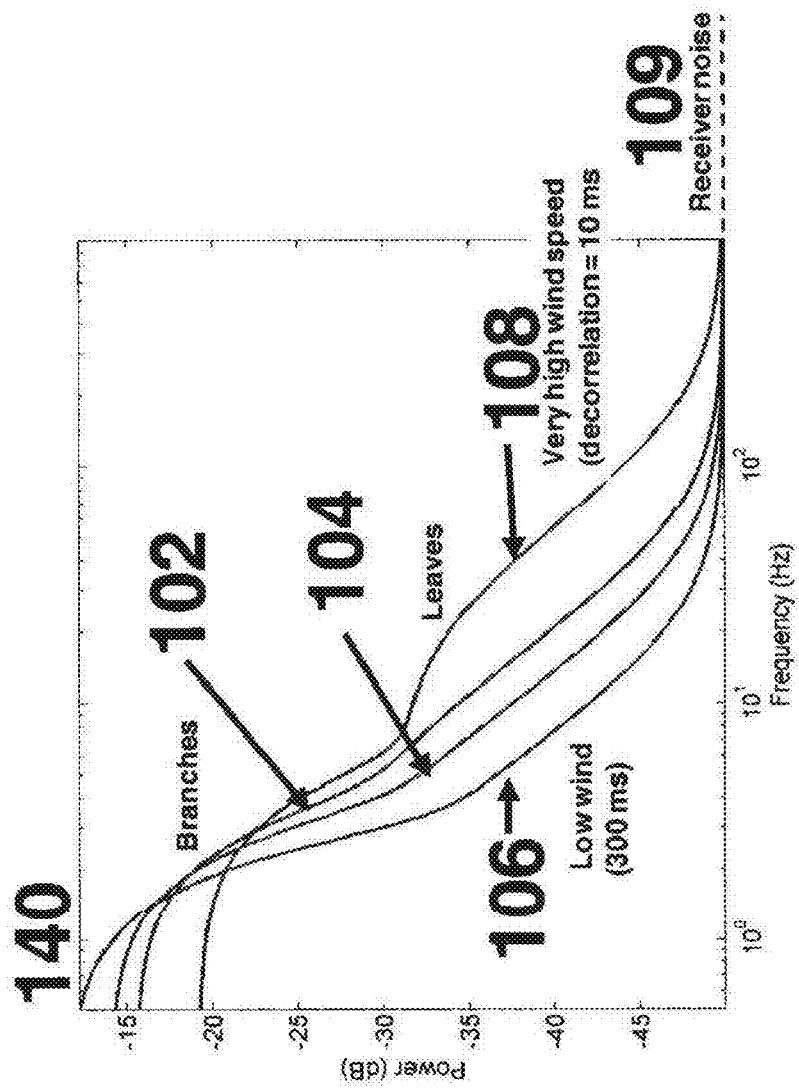

FIG. 9 illustrates power spectral density of the windblown vegetation from Curie (1975).

Figure 10:
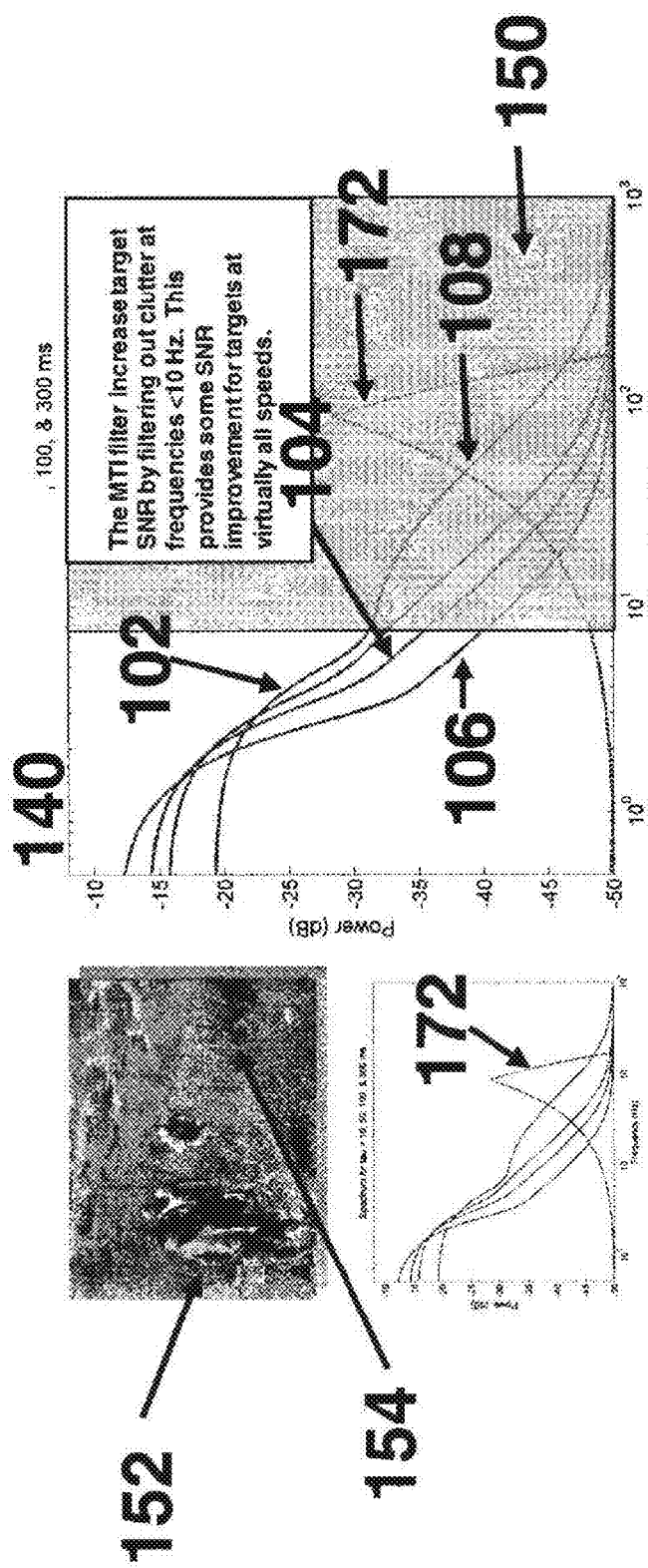

FIG. 10 illustrates power spectral density of the windblown vegetation from Curie (1975) in red and the response from walking people with a peak at ~100 Hz in blue. The shaded blue region indicates the power spectral contributions after applying a high-pass filter to remove the stronger windblown clutter contributions at the lower frequencies below 10 Hz.

Figure 11:
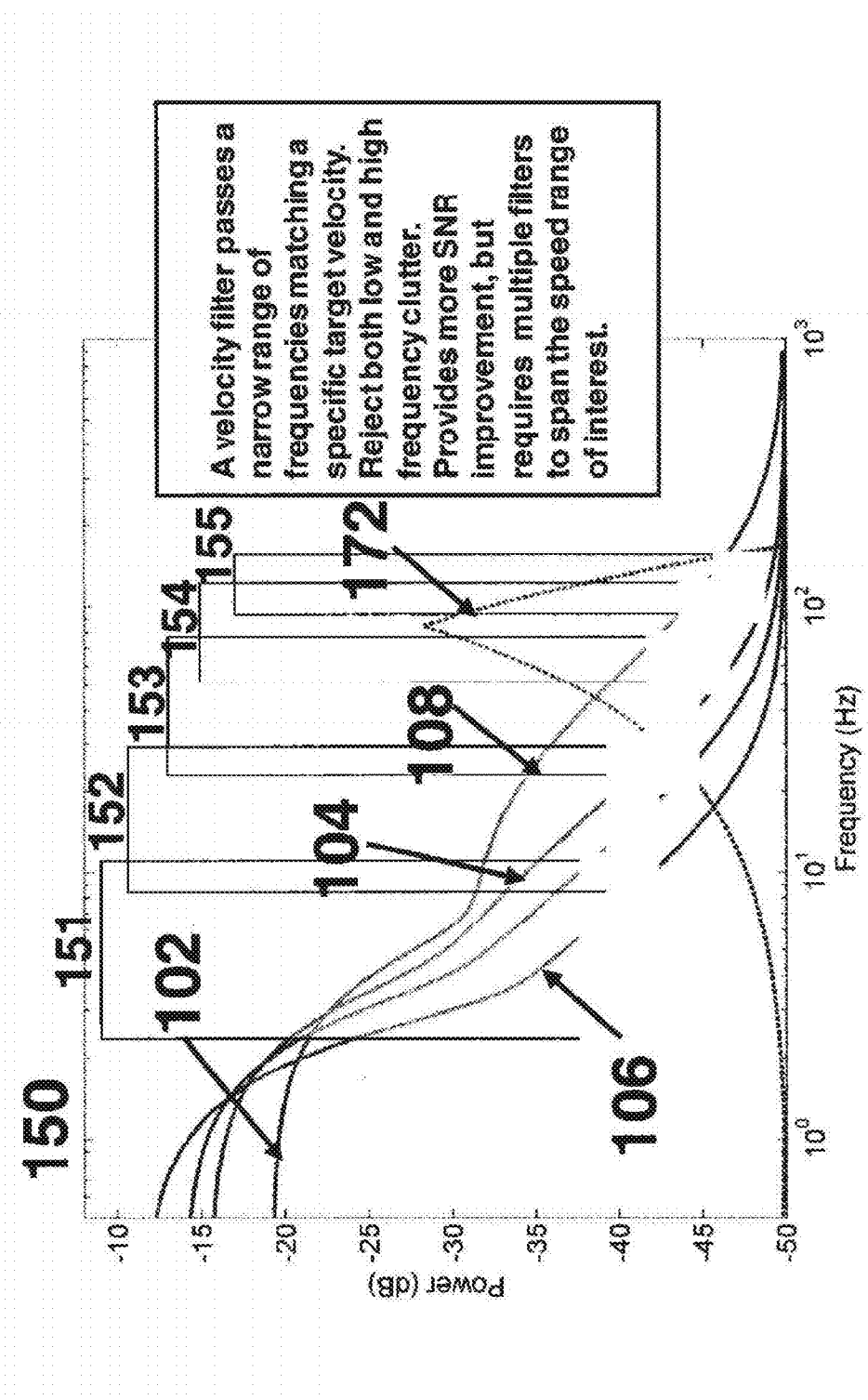

FIG. 11 illustrates the application of a velocity filter to look for targets moving at specific speeds. This provides an SNR improvement.

Figure 12:
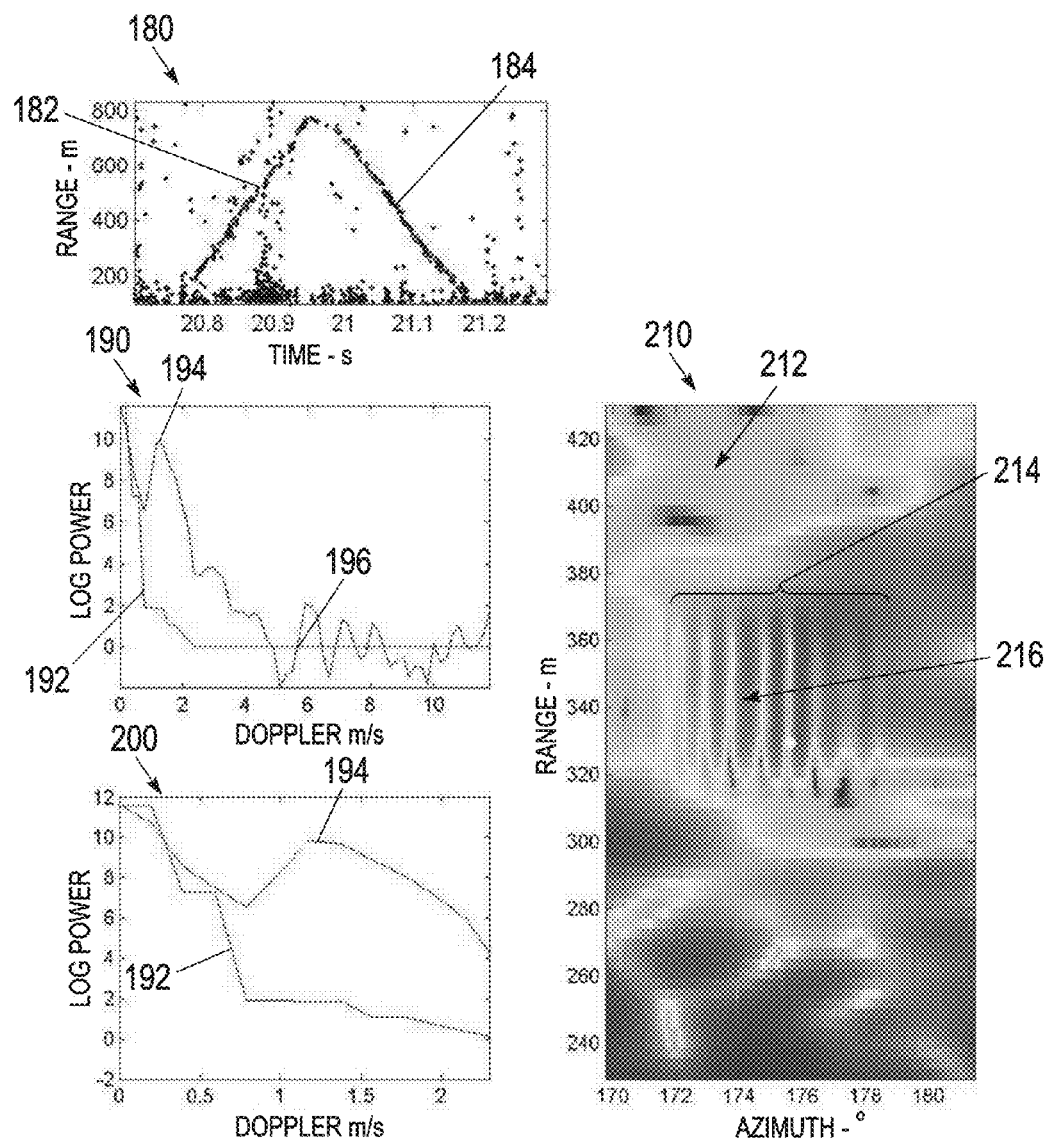

FIG. 12 illustrates the range-time plot for detections of a walker moving away from and then back toward the radar, including the time period when the walker had stopped and changed direction.

Figure 13:
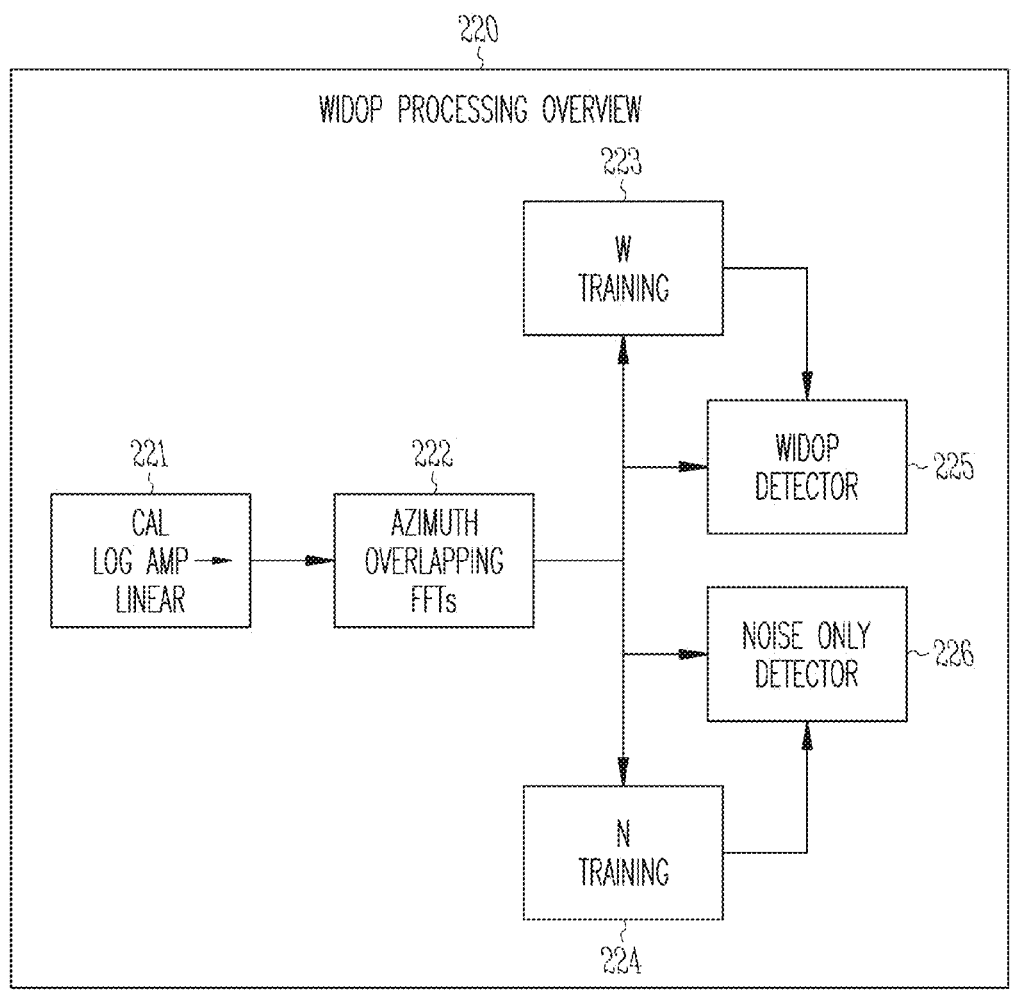

FIG. 13 illustrates the radar processing flow chart for radar conditions where system noise and low clutter exist and where moderate high clutter exist.

DESCRIPTION OF THE PREFERRED EMBODIMENT

In U.S. Pat. No. 8,026,844, Fox, et. al., teaches the use of non-coherent radars for wide-area and persistent surveillance. The methods and apparatuses of the present invention were motivated and developed by the need to detect and track small and/or slowly moving targets over land, such as people, with low-cost, commercial off-the-shelf (COTS), non-coherent X-band maritime radar. The method and apparatus of the present invention allow detection and tracking to be effective in the presence of moderate and high clutter. In fact, clutter conditions, including the presence of strong clutter, are required for the method to work. This processing method can be combined with the existing processing methods taught in U.S. Pat. No. 8,026,844 for detecting and tracking people under system noise condition or low to moderate clutter conditions. Expensive coherent radars using Doppler processing have been used with varying degrees of success for detecting moving people for this application. If sufficient Doppler resolution exists, such that the spectral peak produced by the people (or other targets) can be distinguished from the DC or zero Doppler peak and is above the noise floor of the spectrum, then people and other targets can be detected. The method of the present invention will allow and improve the detection of people and other slow-moving targets near zero velocity because of the application of a whitening algorithm.

Method.

The preferred embodiment of the method of the present invention is comprised of (1) an non-coherent X-band maritime radar, such as a Furuno radar, which is operated to obtain a specified antenna rotation rate with a given antenna beamwidth to ensure the collection of an adequate number of samples for Doppler spectrum analysis for the given DAS sample rate, (2) a high-speed data acquisition system to collect an amplitude time series for spectral analysis, (3) a computer system to process the amplitude/intensity data obtained from the radar to produce an average Doppler spectrum at each radar cell, and (4) signal processing algorithms to detect the target from the average Doppler spectrum and to develop a track for each target detected. It is important to maximize the number of samples collected at each radar cell determined by the range and azimuth resolution of the radar. Many different radars can be used for implementation of the method and this apparatus of the present invention, including non-coherent and coherent radars, provided that they are operated to observe the target-clutter modulation. In general, radars operating at K-band as well as L-, C-, and S-band frequencies, are also good choices for this surveillance application. Most COTS non-coherent radars will require a modification to operate at slower rates than typically used for navigation purposes.

Figure 1:
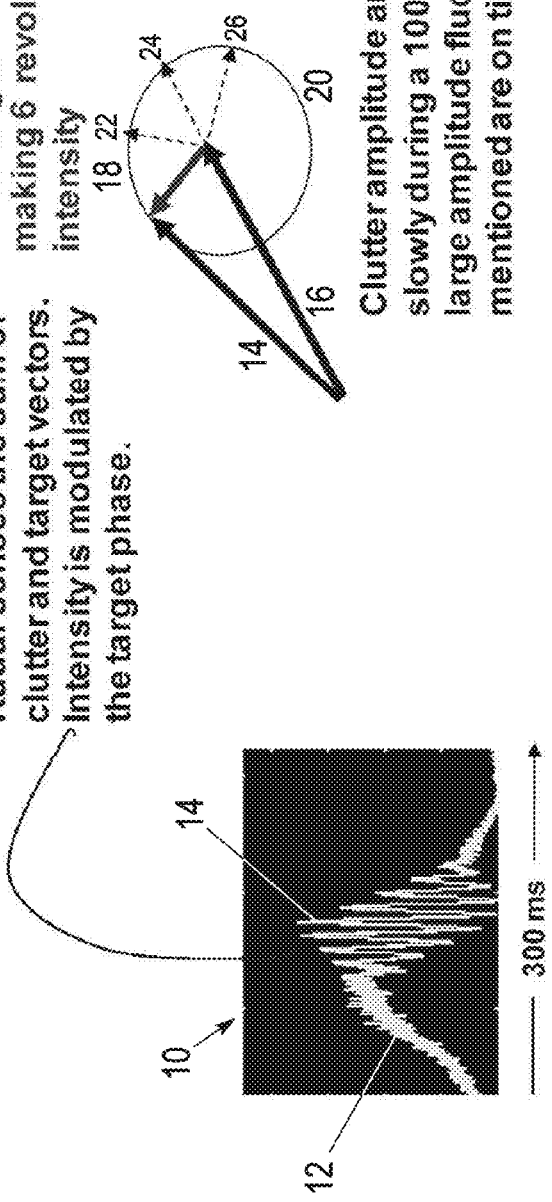
FIG. 1 illustrates the modulation effect produced by a target moving in clutter.
Figure 2:
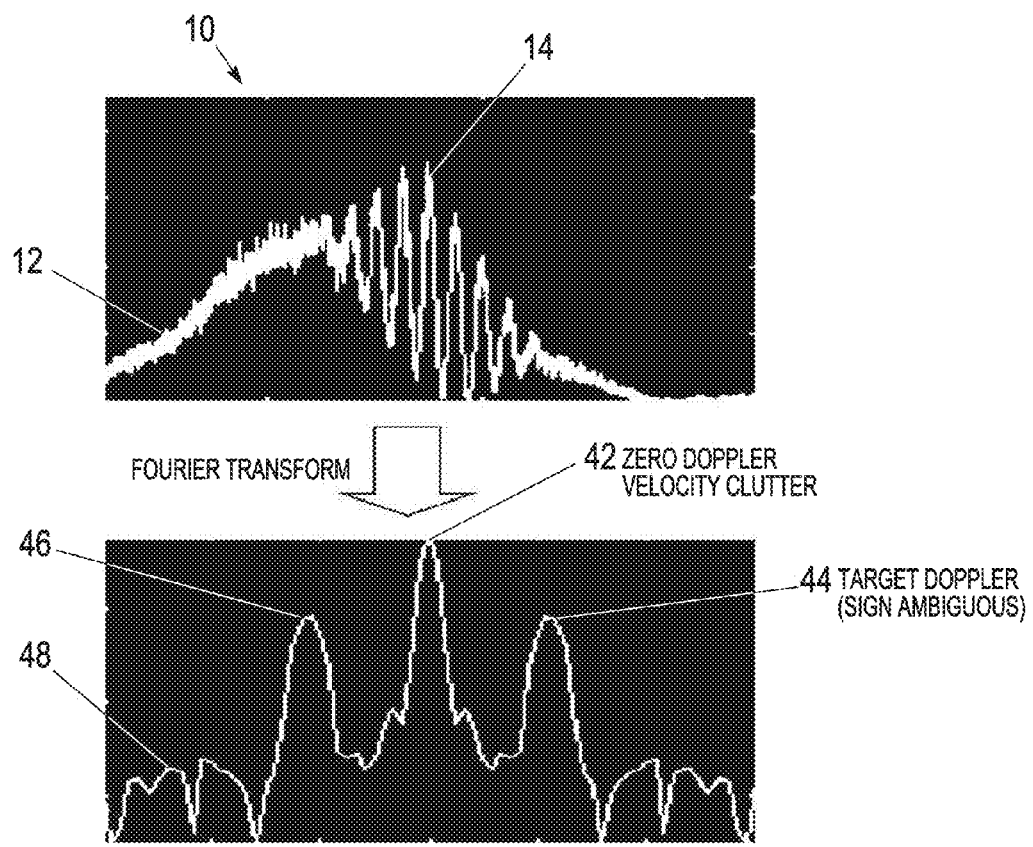
FIG. 2 illustrates the Doppler spectrum obtained from the intensity time series data obtained from an non-coherent radar that is produced by a target moving in clutter.

Wavefront Interference Doppler (WiDop) processing is illustrated in FIGS. 1 and 2. An example of the WiDop phenomenology is presented in FIG. 1. FIG. 1 illustrates this modulation phenomenon 14 that occurs when a moving target is superimposed on quasi-stationary clutter 12. The 300-ms time series 12 on the lower left, which was obtained with an X-band, non-coherent (Furuno) radar, illustrates the target fluctuation 14 as the antenna sweeps over the antenna and the clutter. The vector plot 20 on the right shows the sum 14 of the clutter 16 and target vector 18 (and target vectors 22, 24, 26) in which the intensity is modulated by the target phase. The target backscatter vector 18 is rotating, one revolution per 1.5 cm change in range. A 1-m/s target moves 10 cm in 100 ms, making 6 revolutions, or 6 oscillations in intensity. The clutter amplitude and phase change slowly in comparison to the target during a 100 ms interval. These large amplitude fluctuations are on time scales >100 ms. This target modulation is produced whenever there is clutter, which occurs almost all of the time.

The preferred method of the present invention describes how to take advantage of the phenomenology, based on advanced digital signal processing techniques and radar modifications, to capture, resolve, amplify, and exploit these clutter-induced target signatures for the purpose of using non-coherent radars in remote surveillance and activity monitoring applications. The key processing step is to obtain a Doppler spectrum that accurately represents the target and clutter conditions and to be able to extract small target signals down to zero velocity.

FIG. 2 illustrates a Doppler spectrum 40 obtained for the target and clutter intensity data illustrated in FIG. 1 by taking the Fast Fourier Transform (FFT) 30 of the radar's amplitude time series 10. This Doppler spectrum is an average of multiple revisits by the rotating beam 20 illustrated in FIG. 1. The Doppler spectrum 40 shows the zero velocity Doppler clutter 42 and the target Doppler 44, 46. There is a sign ambiguity in the target Doppler (i.e., it cannot distinguish between target speeds approaching 42 and receding 46 from radar), because only amplitude and no phase information is available.

Figure 3:
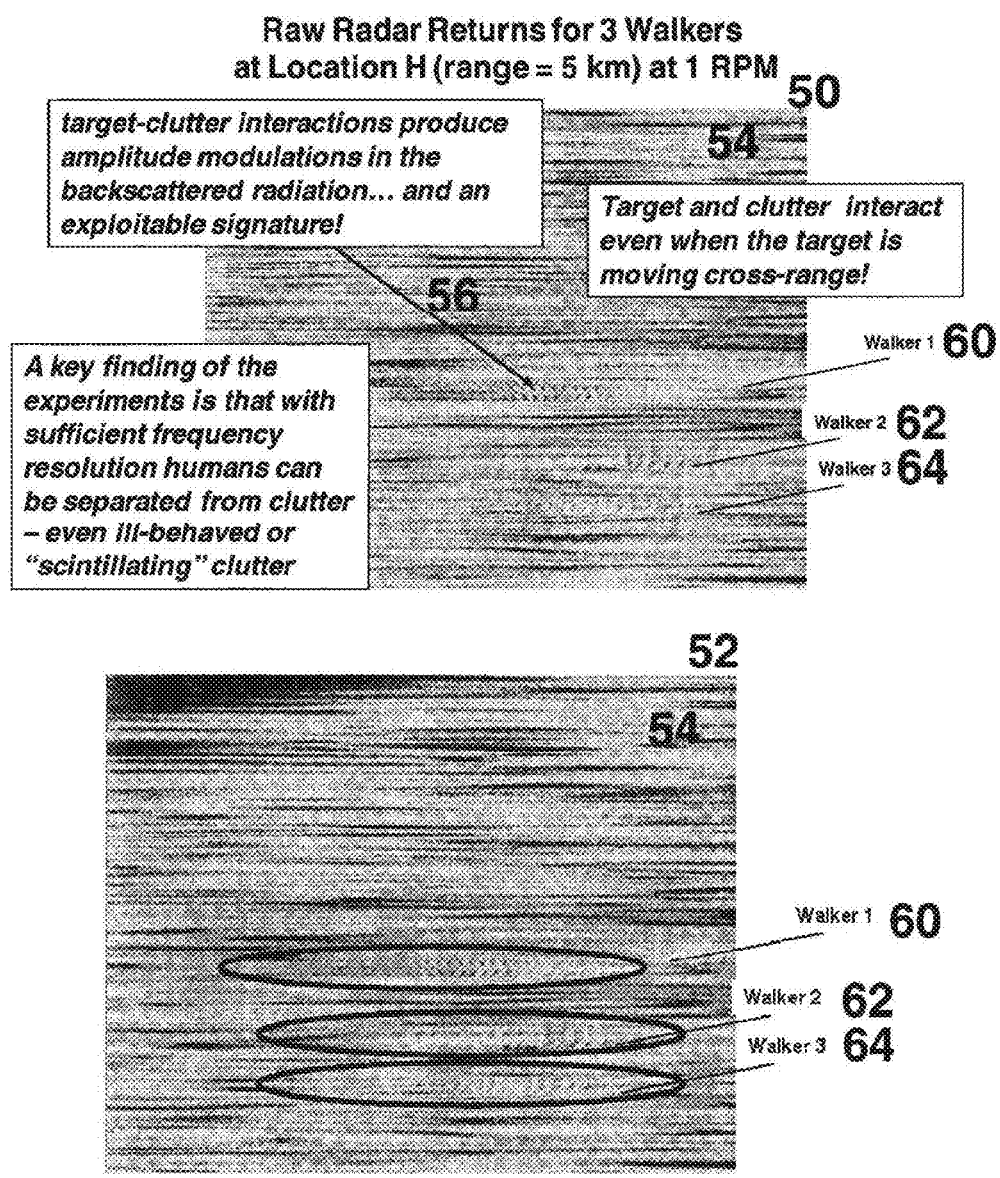
FIG. 3 illustrates the clutter-induced amplitude modulations (circled in red) of the non-coherent radar returns of 3 human targets walking through an area of dense background clutter. The fringe patterns seen for each walker manifest the characteristic signal energy that is an exploitable signature for surveillance and activity monitoring activities.

FIG. 3 illustrates raw radar returns 50 and an enlargement 52 for 3 walkers at a location that was 5 km from the radar scanning a 1 rpm. The clutter-induced amplitude modulations 56 of the non-coherent radar returns of 3 human targets 60, 62, 64 walking through an area of dense background clutter 50. The fringe patterns 60, 62, 64 seen for each walker manifest the characteristic signal energy that is an exploitable signature for surveillance and activity monitoring activities.

Figure 4:
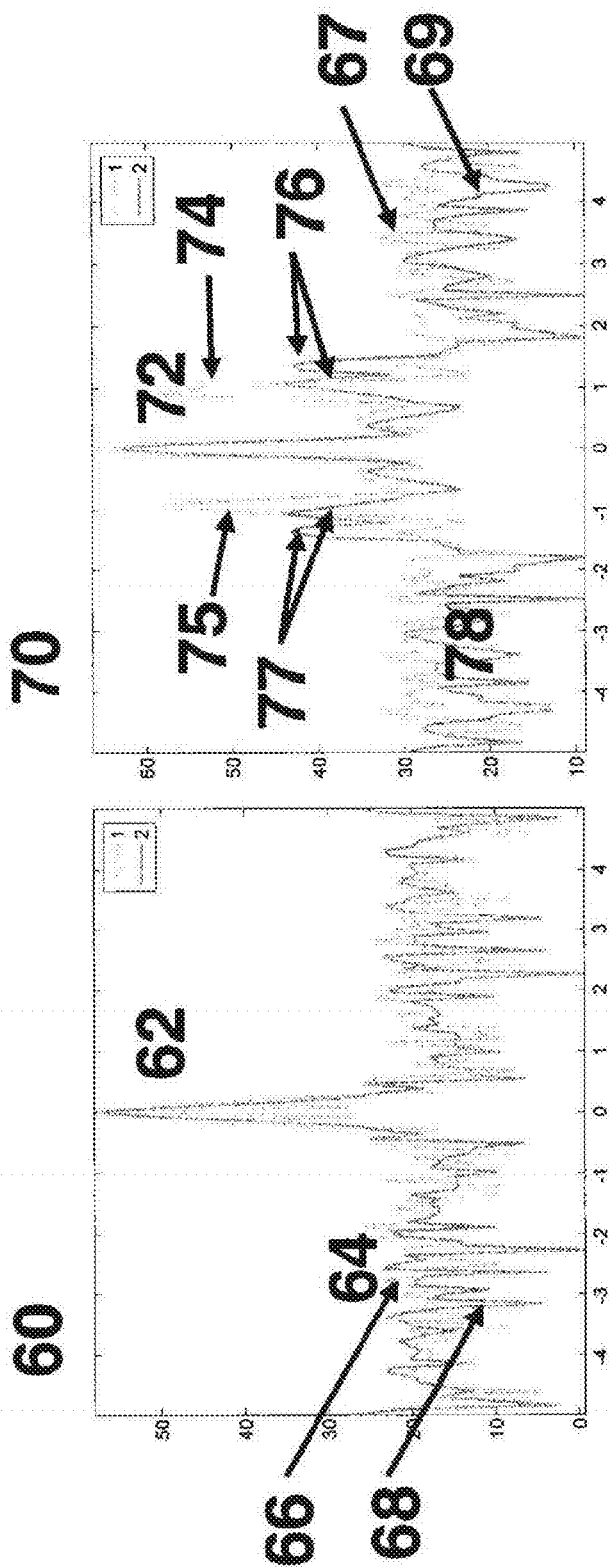
FIG. 4 illustrates power spectral density function estimates for two radar cells when (left) no targets are present and (right) when a, SUV (yellow) and two human targets (red) are present. The sidelobes in the diagram on the right represent the signal energy exploited by the invention for LO target detection.

FIG. 4 illustrates a power spectral density function (i.e., Doppler spectrum) estimated for two radar cells when (left) no targets are present 60 and (right) when a SUV (yellow) and two human targets (red) are present 70. When no targets are present the Doppler spectrum 60 shows the land and wind-blown clutter peaks for both the SUV spectrum 66 and the human spectrum 68 centered on zero Doppler 62, and the background noise 64 for both Doppler spectra. These two features (land and wind-blown clutter peak 72 and background noise 78 for the SUV Doppler spectrum 67 and the human Doppler spectrum 69) are also present in these Doppler spectra 67, 69 with the three targets. The sidelobes 74/75, 76/77 in these Doppler spectra 67, 69 represent the signal energy exploited by the invention for the walkers 76/77 and the SUV 74/75. The present of the positive 74/76 and negative 75/77 peaks illustrate the directional ambiguity, an ambiguity that is removed from the track of these targets.

Figure 5:
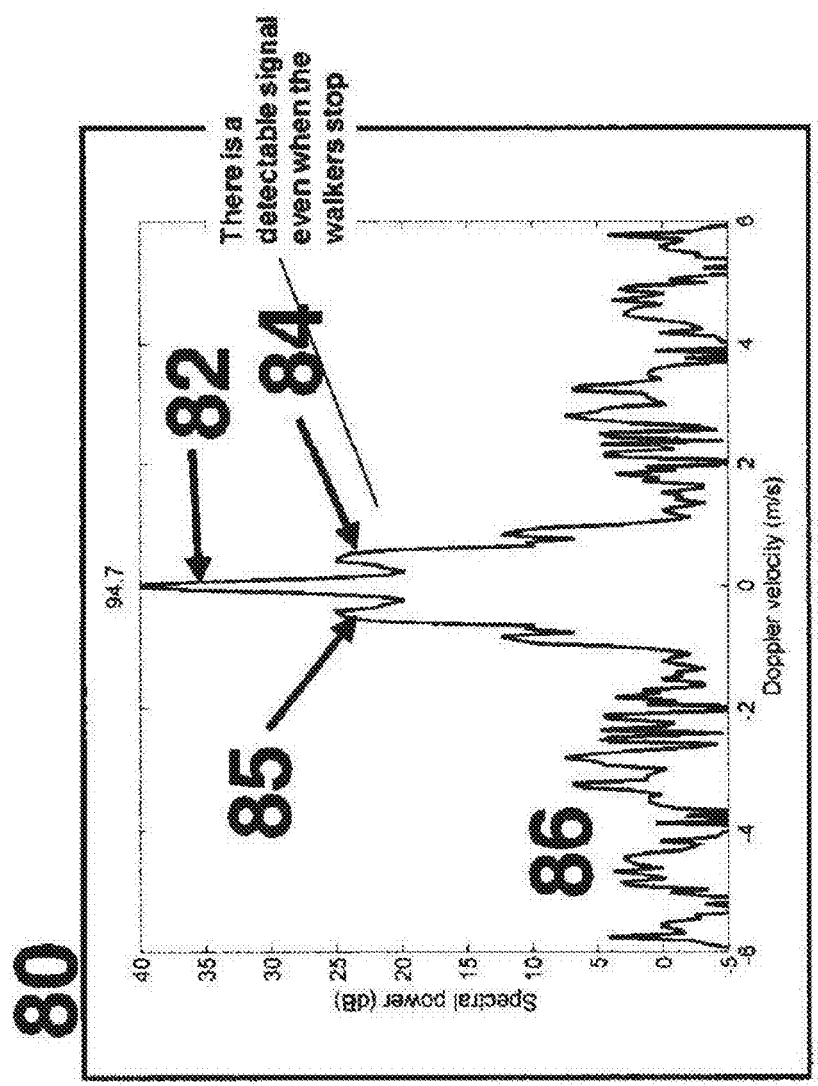
FIG. 5 illustrates a Doppler spectrum obtained for people loitering and not moving.

FIG. 5 illustrates a Doppler spectrum 80 obtained with a non-coherent radar for people loitering and not moving. The stationary land peak 82 is shown. The stationary people are indicated by the two sidelobes 84, 85 which are 25 dB above the background noise 86.

WiDop processing with a non-coherent radar (or with only the amplitude/intensity output from a coherent radar) is very similar to processing real Doppler radar data obtained with a coherent radar except (1) there is a directional ambiguity in the non-coherent data for targets approaching and receding from the radar, (2) the Doppler velocity estimated with a non-coherent radar may not be as precise as that obtained with a coherent radar, and (3) a non-coherent radar will only get averaging gain but no coherent gain against receiver noise. These disadvantages are not highly significant, because clutter needs to be present for the data obtained from the non-coherent radar to be processed, which means the radar is operating against clutter and not system noise. Also, the ambiguity and the Doppler precision are offset, because non-coherent radars resolve direction and velocity by tracking the targets as they move from one location to another location over time. As stated above, this one of the important advantages of a non-coherent radar over a Doppler radar, because stationary targets and targets moving perpendicular to the look direction can be detected, which is not possible with a Doppler radar. The data collection scheme is similar to the data collection scheme of a Doppler radar, because both need sufficient coherent integration time at each location to resolve to resolve moving targets from stationary clutter.

The method of the present invention applies to non-coherent radars and can be used with the amplitude output of a coherent radar. Amplitude data is collected with non-coherent radars that have been equipped to transmit and receive radar pulses with the antenna moving at a specified rotational speed. A controller unit is added to the Furuno radar to allow the radar to operate at any speed up to its maximum and to operate at a slower speed during data collection. Radar pulses are broadcast at a constant temporal rate, but different radial sectors of the surrounding environment are interrogated at different times, depending on the azimuthal position and rotation rate of the radar antenna. The degree to which different sectors overlap depends on the antenna rotation rate and with the beamwidth, i.e., the angular interval over which the pulse power lies above some predetermined threshold value. Beamwidth is a fixed property of the antenna used to equip the radar. As the antenna rotation rate is slowed and a greater number of radar pulses satisfy the beam overlap criteria for any given sector, a greater number of the returns from those pulses can be coherently integrated to form an estimate of power spectral density function encompassing all overlapping pulses in that sector. The power spectral density estimate not only includes energy returned to the antenna by the direct backscattering of the radar pulses but also energy due to interference effects, up to and including amplitude modulations arising from target-clutter interactions.

Once resolved from the clutter-based frequency response, the excess exoclutter signal energy (i.e., the target sidelobes in FIGS. 4 and 5, is used as a basis for target detection through matched filtering, where the filter band that is applied is designed to optimally match the particular target type of interest and adapt to the background clutter spectrum of the locale where the radar is operating.

Besides matched filtering, there are a number of important additions to WiDop that significantly improve performance. They are (1) synchronization of the data acquisition system (DAS) with the radar trigger pulse, (2) whitening of the spectrum to minimize the effects land and wind clutter, which can mask slow moving targets like people, and (3) the conversion of the log-amplifier data to linear power before applying the WiDop spectral processing algorithm. All four of these make WiDop more powerful for detecting and tracking low-velocity targets in clutter.

As stated above, the modulation is produced because the target is moving more rapidly than the clutter. There are, however, two types of target movement. The first is a produced by a position change (e.g., a person walking). The second occurs from the motion of the motion of the arms and legs of a person. Thus, it is also possible to detect a person who is stationary and is not changing position, as illustrated in FIG. 5.

While WiDop works best for a non-coherent radar that stares in one direction for a long time, it works for radars in which the antenna rotates many 360-degree rotations each minute like maritime and wide-area surveillance radars, and it works for radars in which the antenna sweeps back and forth over a sector angle, such as those found on military radars with a detection mission that only requires interrogation of a limited region. For WiDop to work, a sufficient number of samples must be obtained to generate the initial WiDop spectrum. The number of samples depends upon the rotation rate, the beamwidth, and the number of received pulses. Ideally, for the best target localization, an antenna with the smallest beamwidth possible is desired. However, if the beamwidth is too narrow, then the number of radar amplitude samples obtained across the beam for each rotation of the radar will not be sufficient to obtain a high resolution Doppler spectrum. This is also true if the rotation rate of the radar antenna is too fast.

Most of the maritime non-coherent radars operate with antennas that rotate 20 to 40 times per minute. At these rotation rates, the modulation required for waveform interference Doppler processing is observed for vehicles because of adequate coherent integration, but is not observed for slowly moving targets such as people walking because of inadequate coherent integration. By slowing the antenna rotation between 0 and 5 to 10 rpm allows sufficient radar dwells to observe and exploit the target modulation.

To optimize the detection of people, vehicles, and low-flying aircraft/ultra-lights located in regions of clutter with a non-coherent radar (or coherent radar), the rotation rate of the antenna should be slow enough to allow the radar to coherently collect data at each radar dwell location. For walking speeds of humans, for example, the radar dwell time should be ~100 ms (to 300 ms), which is ~10 (to 30) times longer than normal for an X-band Furuno radar. The normal Furuno dwell time is ~10 ms, which is too short to detect amplitude modulations. These longer dwell times can be obtained with a Furuno radar (or other X-band marine radars) by slowing down antenna rotation from 23 rpm to 5 rpm. The dwell times can be increased by using a wide beam (i.e., a smaller antenna). Radar dwells of 100 ms are similar to many of the coherent Ku- and X-band radar used for detection of people and vehicles. (e.g., the MSTAR and ARSS radars operated by DHS on the Southern Border of the United States.)

A time sequence (i.e., movie) of target detections at 5 km were made for measurements made with a non-coherent, X-band, Furuno radar. Detections were made from the Doppler spectra. FIG. 6 illustrates a comparison between the raw data 100 and the MTI 110 and WiDop-processed 120 data for two walkers and a SUV vehicle. The WiDop detections. 122, 124, 126 are significantly stronger than the detections made with an MTI processor 112, 114, 116. The targets 102, 104, 106 are not visible in the raw data. The circles indicating the location of the walkers and the SUV are slightly offset to the left of the actual location of the targets so that the processed return can be more clearly seen.

FIG. 7 illustrates a plot 130 of the frequency resolution versus the rotation rate of a non-coherent, X-band Furuno radar, but such a curve can be produced for any radar. Three frequency resolution-revisit time curves are illustrated, one for the characteristics of three different Furuno radars 132, 134, 136 with different antenna beamwidths and different radar powers. The optimal performance for any of the radars is the knee in the curve. For the Furuno 1964C radar, with a 1.9-degree beamwidth, the optimal tradeoff 138 is a revisit rate of 13.8 s, which corresponds to a rotation rate of 4.4 rpm vice the normal rate of 23 rpm, and yields a frequency resolution of 13.8 Hz. The frequency resolution can be improved by slowing the antenna or broadening the beam. Slowing the radar is preferred, because this does not degrade the cross-range resolution. The system does not have to operate at the optimal tradeoff position and satisfactory performance can be obtained by operating above or below the knee in the curve.

In addition to land clutter, windblown vegetation clutter can interfere with the detection of slow moving targets. As illustrated in FIGS. 8 and 9, it has been long known that the windblown vegetation such as the motion of trees (i.e., mainly the leaves) and other vegetation produced by the wind can produce strong clutter at very low Doppler frequencies. FIG. 8 illustrates a variety of different types of vegetation 250, 252, and 554 that produce windblown clutter that might prevent the detection of a person walking slowly. Even small vegetation 250, 252, which is smaller than a person, can degrade detection performance. FIG. 9 illustrates the power spectral density 140 of the windblown vegetation from Curie (1975). FIG. 9 shows four spectra, one for very high wind speeds 108, one for leaves 102, one for branches 104, and one for low winds 106. This windblown clutter can be removed using a high-pass filter to allow slowly moving targets to be detected. These methods will be described below.

FIG. 10 illustrates the power spectral density of the windblown vegetation from Curie (1975) in red 102, 104, 106, 108 and the response 172 for walking people 152 in vegetation 154 with a peak at ~100 Hz in blue 150. The shaded blue region 150 indicates the power spectral contributions after applying a high-pass filter to remove the stronger windblown clutter contributions at the lower frequencies below 10 Hz.

FIG. 11 illustrates the application of velocity filters 151, 152, 153, 154, 155 to look for targets moving at specific speeds in the windblown clutter spectra 150 (102, 104, 106, 108). These filters 151, . . . , 155 can look for very specific speed intervals (e.g., 0.25 to 0.50 m/s), a bank of very specific speed intervals (e.g., 0.25 to 0.50 m/s; 0.50 to 0.75 m/s; etc.), or a wide range of speed intervals for the type of target to be detected (e.g. 0.25 to 5 m/s for people). These filters increase the SNR of the target, because the noise outside the speed interval of the target is removed.

FIG. 12 illustrates a walker being detected using a bank of filters. The range versus time plot 180 show that the walker is detected as the walker moves away from 182 and back to 184 the radar, including the time in which the walker has stopped and changed direction (i.e., at a speed of 0 m/s). The full Doppler spectra 190 and the Doppler spectra over walking velocities 200 with the walker moving at 1.5 m/s 194 and the clutter 192 are shown. The intensity fluctuations 212 illustrating the target fluctuations 214, 216 in the raw data 210 is also shown.

Range jitter can reduce the performance of the radar. Three general methods of synchronization can be used to reduce range jitter caused by variations in the timing of collected data relative to the radar trigger pulse timing. These methods involve hardware synchronization of the actual radar trigger pulse, hardware synchronization of the data collection system using the leading edge of the radar "main bang" pulse, and software processing that "re-aligns" the data in range. Without any synchronization, the resultant range jitter is at least ±½ Ts where Ts is the data collection system clock period (e.g. ±10 ns for a 50 MHz clock). These synchronization methods are described in more detail below.

The first hardware method involves intercepting the radar trigger pulse (which may have a random, unrelated timing relationship with the data collection system clock) and synchronizing that trigger with the data collection system clock. This is possible where there is access to the trigger signal. The synchronized radar trigger signal is then coherent with the data collection system clock and the only remaining range jitter is that inherent in the radar pulse circuitry.

The second hardware method involves using the leading edge of the radar's "main bang" to start the sampling of the data collection system. This method usually involves using a much higher data collection system clock, typically 8 to 16 times faster sampling, and then throwing away most of the data. The synchronization results in range jitter that is at least ±½ Ts where Ts is now the much smaller clock period.

The third approach uses software to "re-align" the data on a pulse by pulse basis. This method depends on the general character of the clutter return remaining consistent from pulse to pulse. The range realignment is done on a sub-sample level (e.g. $\frac{1}{5}^{th}$ of the range cell) to reduce the range jitter. This method can result in a phenomenon called "range drift", where the processed data range slowly drifts from the true value, when the clutter versus time has a regular and tilted (in range) characteristic.

All three methods have been used because each of the COTS radars operate differently. The first and second methods are preferred.

A whitening function is used with WiDop to reduce the clutter at low Dopplers near 0 Hz so that slow moving targets such as people can be seen. FIG. 12 illustrates schematically the detection problem for slow moving targets that might be masked by land clutter and windblown clutter. The target signal 194 may be on the skirt of the clutter spectrum 192 as illustrated in. FIG. 12. The clutter spectrum (for both Doppler and WiDop) consists of DC clutter, a quasi-exponential spectrum of windblown clutter, and white noise (WN) floor 196. In conventional Doppler radars, the WN is related to receiver noise. In WiDop, the noise floor also comes from internal receiver noise, but is amplified (scaled) by the clutter power.

The formal approach for detecting signals in nonwhite Gaussian noise (i.e., colored noise) consists of a preliminary step of passing the signal through a linear filter. The filter whiten's (i.e., flattens) the spectrum. In WiDop, there is an additional requirement to normalize the white noise amplification on a cell-by-cell basis. This is followed by a power spectrum filter (or some other form of Doppler frequency filter), followed by a likelihood ratio detector. The rough equivalence of the formal likelihood detector can be achieved with the following approach. First, compute the power spectrum and then take the log of the power spectrum. A background method is then used to train (i.e., learn) the log spectrum in every radar cell, presumably without signal present. The trained spectrum is subtracted from the current spectrum. Subtracting the trained spectrum from the current real-time spectrum in a given radar cell should produce a flat (white) spectrum when there is no target signal present. The difference is the "score" for detection and is roughly equivalent to the Likelihood Ratio used in the optimum detector.

As shown, the target signal is narrow band and occurs in one FFT bin. In reality, the signal may have some spectral width, which bandwidth should be matched in the detector.

Both simple and complex approaches have been taken for training on the clutter. A very simple whitening approach is to determine the level of the clutter empirically in the zero Doppler bin and the adjacent Doppler bins. One way to do this is to model the clutter spectrum (i.e., the red spectrum) as a polynomial function of the power in or near the DC bin, and then use this function to remove clutter from these bins so that targets are better identified. This polynomial function is empirically determined from the radar data. There is one polynomial function for each frequency bin, and the polynomial coefficients are estimated from the data.

More advanced whitening functions can be used that train the clutter spectrum with data from both the surrounding cells and with integration over time. Subtracting the trained spectrum from the current real time spectrum in a given radar cell should produce a flat (i.e., white) spectrum when there is no signal present. Deviations from a white spectrum would indicate a possible target signal.

FIG. 13 summarizes the radar processing method using WiDop processing. Two methods are used. First, the log of the raw radar data 221 is obtained. Next FFT's are obtained for the overlapped azimuth scans 222. If the clutter is too low to use WiDop, then the Bayesian track-before-detect methods described in U.S. Pat. No. 8,330,647 are used. This requires some background training 224 before the Voice Only Detector 226 is applied. If the clutter is high enough, then the WiDop training 223 and WiDop Detector 225 are used.

The output of the Detectors 224, 225 are used to develop a target track as taught in U.S. Pat. No. 8,026,844. This track further increases the probability of detection and greatly reduces the probability of false alarm (i.e., the number of false alarms).

Apparatus.

The preferred embodiment of the apparatus of the present invention is comprised of (1) an non-coherent X-band maritime radar, such as a Furuno radar, which is operated to obtain a specified antenna rotation rate with a given antenna beamwidth to ensure the collection of an adequate number of samples for Doppler spectrum analysis for the given DAS sample rate, (2) a controller system to change the rotation rate of antenna set by the radar manufacturer, (3) a high-speed data acquisition system to collect an amplitude time series for spectral analysis, (4) a computer system to process the amplitude/intensity data obtained from the radar to produce an average Doppler spectrum at each radar cell, and (5) signal processing algorithms to detect the target from the average Doppler spectrum and to develop a track for each target detected.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for detecting the presence of one or more targets of interest over land, the method comprising:
    collecting, using a data acquisition system, amplitude data over a period of time from a radar over a coverage area, the amplitude data having amplitude modulations produced by the interaction of radar clutter in the coverage area and one or more targets of interest in the radar coverage;
    identifying, using at least one processor, frequency characteristics in the amplitude modulations over the period of time;
    detecting, using the at least one processor, the presence of the one or more targets by:
        comparing the identified frequency characteristics of the amplitude modulations in the amplitude data produced by modulation of the one or more targets and the radar clutter relative to frequency characteristics of amplitude modulations of the radar clutter without the one or more targets;
        computing a power spectrum from a time series of the amplitude data and identifying the presence of the one or more targets in the power spectrum above the radar clutter and background spectral noise;
        converting the amplitude data from log-amplifier data to linear power;
        computing the FFTs on overlapping azimuths; and
        match filtering the amplitude data.

2. The method of claim 1 wherein computing the power spectrum includes computing the power spectrum after applying a high-pass filter to the amplitude data to remove the radar clutter and system noise below target speeds of interest.

3. The method of claim 1 wherein computing the power spectrum includes computing the power spectrum after applying a band-pass filter to the amplitude data to remove the radar clutter and system noise on both sides of a frequency band containing the target signal.

4. The method of claim 1 wherein computing the power spectrum includes computing the power spectrum after applying a high-pass filter to the amplitude data to remove the clutter and system noise at low frequencies.

5. The method of claim 1 wherein computing the power spectrum includes computing the power spectrum after applying a low-pass filter to the amplitude data to remove the clutter and system noise above the target speeds of interest.

6. The method of claim 1 wherein the power spectrum is obtained by combining two or more power spectra.

7. The method of claim 6, where the power spectrum is obtained by averaging two or more power spectra.

8. The method of claim 1 wherein detecting the presence of the one or more targets comprises combining two or more detections.

9. The method of claim 1 wherein detecting the presence of the one or more targets comprises developing a track from the detections.

10. The method of claim 9, wherein speed of a particular target of the one or more targets is determined from the track of the particular target.

11. The method of claim 1 where a track is developed from two or more detections.

12. The method of claim 1 wherein computing the power spectrum includes subtracting a power spectrum without the presence of the one or more targets from the power spectrum obtained with the one or more targets present.

13. The method of claim 12, further including obtaining the power spectrum without the one or more targets from a background library of the radar location when the one or more targets are not present.

14. The method of claim 1 further including applying a whitening function to the power spectrum to reduce the level of the radar clutter.

15. The method of claim 1 further including applying a velocity filter to the power spectrum to pass a narrow range of frequencies matching a specific target velocity.

16. The method of claim 15, wherein applying a velocity filter includes applying a plurality of target velocity filters.

17. The method of claim 1 further including applying an MTI filter to the power spectrum to filter out the lowest clutter frequencies.

18. The method of claim 1 further comprising:
whitening of the amplitude data on a radar cell-by-radar cell basis.

19. The method of claim 18 further comprising:
bandpassing the amplitude data into velocity bins.

20. The method of claim 1, wherein detecting the presence of one or more targets comprises bandpassing a time series of the amplitude data into velocity ranges to identify particular targets of the one or more targets moving at certain speeds and comparing the level of fluctuations to the radar clutter and background noise in velocity bins where none of the one or more targets are present.

21. The method of claim 1, wherein detecting the presence of the one or more targets comprises developing a track from the detections.

22. The method of claim 21, wherein speed of a particular target of the one or more targets is determined from the track of the particular target.

23. The method of claim 1, where the radar data is obtained over a duration in which the de-correlation time of the target signal is less than the de-correlation time of the clutter.

24. The method of claim 1, wherein collecting the amplitude data includes continuously rotating the antenna 360 degrees at a rate that allows coherent integration of the data in any one general direction to allow the modulation to be detected.

25. A system for detecting the presence of one or more targets of interest over land, the system comprising:
at least one processor:
at least one storage device comprising instructions stored thereon, wherein when the instructions are executed by the at least one processors, configure the at least one processor to perform operations comprising:
collecting, using a data acquisition system, amplitude data over a period of time from a radar over a coverage area, the amplitude data having amplitude modulations produced by the interaction of radar clutter in the coverage area and one or more targets of interest in the radar coverage;
identifying frequency characteristics in the amplitude modulations over the period of time;
detecting the presence of the one or more targets by:
comparing the identified frequency characteristics of the amplitude modulations in the amplitude data produced by modulation of the one or more targets and the radar clutter relative to frequency characteristics of amplitude modulations of the radar clutter without the one or more targets;
computing a power spectrum from a time series of the amplitude data and identifying the presence of the one or more targets in the power spectrum above the radar clutter and background spectral noise;
converting the amplitude data from log-amplifier data to linear power;
computing the FFTs on overlapping azimuths; and
match filtering the amplitude data.

26. A non-transitory computer-readable medium comprising instructions, which when executed by at least one processor, configure the at least one processor to perform operations comprising:
collecting, using a data acquisition system, amplitude data over a period of time from a radar over a coverage area, the amplitude data having amplitude modulations produced by the interaction of radar clutter in the coverage area and one or more targets of interest in the radar coverage;
identifying frequency characteristics in the amplitude modulations over the period of time;
detecting the presence of the one or more targets by:
comparing the identified frequency characteristics of the amplitude modulations in the amplitude data produced by modulation of the one or more targets and the radar clutter relative to frequency characteristics of amplitude modulations of the radar clutter without the one or more targets;
computing a power spectrum from a time series of the amplitude data and identifying the presence of the one or more targets in the power spectrum above the radar clutter and background spectral noise;
converting the amplitude data from log-amplifier data to linear power;
computing the FFTs on overlapping azimuths; and
match filtering the amplitude data.

* * * * *